United States Patent
Salkintzis

(10) Patent No.: US 10,440,555 B2
(45) Date of Patent: *Oct. 8, 2019

(54) PROCEDURES TO SUPPORT NETWORK SLICING IN A WIRELESS COMMUNICATION SYSTEM

(71) Applicant: Motorola Mobility LLC, Chicago, IL (US)

(72) Inventor: Apostolis Salkintzis, Athens (GR)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,706

(22) Filed: Jul. 16, 2018

(65) Prior Publication Data

US 2018/0324576 A1   Nov. 8, 2018

Related U.S. Application Data

(63) Continuation of application No. 15/141,870, filed on Apr. 29, 2016, now Pat. No. 10,028,128.

(51) Int. Cl.
*H04W 8/02* (2009.01)
*H04W 12/06* (2009.01)
(Continued)

(52) U.S. Cl.
CPC ............ *H04W 8/02* (2013.01); *H04W 12/06* (2013.01); *H04W 36/0027* (2013.01);
(Continued)

(58) Field of Classification Search
CPC ....... H04W 8/02; H04W 76/14; H04W 12/06; H04W 36/0027; H04W 48/14;
(Continued)

(56) References Cited

U.S. PATENT DOCUMENTS

| 2002/0007414 A1 | 1/2002 | Inoue et al. |
| 2010/0029286 A1 | 2/2010 | Pfeiffer |

(Continued)

FOREIGN PATENT DOCUMENTS

| WO | 2009/071431 A1 | 6/2009 |
| WO | 2013/110543 A1 | 8/2013 |
| WO | 2015/182141 A1 | 12/2015 |

OTHER PUBLICATIONS

PCT0US2017/030406, "Notification of Transmittal of the International Search Report and the Written Opinion of hte International Searching Authority, or the Declaration", Jan. 11, 2018, pp. 1-20.

(Continued)

*Primary Examiner* — Mong-Thuy T Tran
(74) *Attorney, Agent, or Firm* — Kunzler Bean & Adamson

(57) ABSTRACT

Apparatuses, methods, and systems are disclosed for mobility management among multiple network slices. One apparatus includes a processor that receives a mobility management request from the mobile unit and forwards the mobility management request to the secondary network slice. Here, the mobile unit is simultaneously served by the primary network slice and a secondary network slice of the mobile communication network. The apparatus sends a single mobility management response to the mobile unit, wherein the single mobility management response includes a first response from the primary network slice and a second response from the secondary network slice. In various embodiments, the apparatus may include a network interface for communicating over a mobile communication network.

18 Claims, 7 Drawing Sheets

(51) Int. Cl.
*H04W 48/14* (2009.01)
*H04W 60/04* (2009.01)
*H04W 60/06* (2009.01)
*H04W 36/00* (2009.01)
*H04W 76/14* (2018.01)
*H04W 48/18* (2009.01)
*H04W 4/70* (2018.01)

(52) U.S. Cl.
CPC ........... *H04W 48/14* (2013.01); *H04W 60/04* (2013.01); *H04W 60/06* (2013.01); *H04W 76/14* (2018.02); *H04W 4/70* (2018.02); *H04W 48/18* (2013.01)

(58) Field of Classification Search
CPC ..... H04W 48/18; H04W 60/04; H04W 60/06; H04W 4/70
USPC ..................................................... 455/435.1
See application file for complete search history.

(56) References Cited

U.S. PATENT DOCUMENTS

| | | |
|---|---|---|
| 2010/0189115 A1 | 7/2010 | Kitada |
| 2011/0300864 A1 | 12/2011 | Gruber |
| 2013/0007232 A1* | 1/2013 | Wang ................. H04L 63/0272 709/222 |
| 2013/0272216 A1* | 10/2013 | Riggio ................. H04W 16/22 370/329 |
| 2013/0303114 A1 | 11/2013 | Ahmad et al. |
| 2013/0346585 A1 | 12/2013 | Ueno |
| 2014/0086177 A1 | 3/2014 | Adjakple et al. |
| 2015/0200849 A1 | 7/2015 | Wen et al. |
| 2015/0237536 A1 | 8/2015 | Shu et al. |
| 2015/0256994 A1 | 9/2015 | Liu et al. |
| 2015/0365288 A1 | 12/2015 | Van Der Merwe et al. |
| 2016/0105790 A1 | 4/2016 | Shu |
| 2016/0112896 A1 | 4/2016 | Karampatsis et al. |
| 2016/0142860 A1 | 5/2016 | Kim et al. |
| 2016/0353465 A1* | 12/2016 | Vrzic .................. H04W 12/06 |
| 2017/0041776 A1* | 2/2017 | Faccin .................. H04W 8/18 |
| 2017/0054595 A1* | 2/2017 | Zhang ................ H04L 41/0896 |
| 2017/0070892 A1* | 3/2017 | Song .................... H04L 41/042 |
| 2017/0086049 A1 | 3/2017 | Vrzic |
| 2017/0086118 A1 | 3/2017 | Vrzic |
| 2017/0141973 A1 | 5/2017 | Vrzic |
| 2017/0208019 A1* | 7/2017 | Shimojou ........... H04L 12/4641 |

OTHER PUBLICATIONS

NGMN, "NGMN 5G White Paper", NGMN Alliance V1.0, European Telecommunications Standards Institute (ETSI), Jun. 25, 2015, pp. 1-124.

* cited by examiner

PROCEDURES TO SUPPORT NETWORK SLICING IN A WIRELESS COMMUNICATION SYSTEM

FIELD

The subject matter disclosed herein relates generally to wireless communications and more particularly relates to supporting network slicing in a wireless communication system.

BACKGROUND

The following abbreviations are herewith defined, at least some of which are referred to within the following description.

Third Generation Partnership Project ("3GPP"), Access and Mobility Management Function ("AMF"), Access Point Name ("APN"), Access Point ("AP"), Access Stratum ("AS"), Carrier Aggregation ("CA"), Clear Channel Assessment ("CCA"), Control Channel Element ("CCE"), Control Plane ("CP"), Channel State Information ("CSI"), Call Session Control Function ("CSCF"), Common Search Space ("CSS"), Data Network Name ("DNN"), Data Radio Bearer ("DRB"), Downlink Control Information ("DCI"), Downlink ("DL"), Enhanced Clear Channel Assessment ("eCCA"), Enhanced Mobile Broadband ("eMBB"), Evolved Node-B ("eNB"), Evolved Packet Core ("EPC"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Globally Unique Temporary UE Identity ("GUTI"), Hybrid Automatic Repeat Request ("HARQ"), Home Subscriber Server ("HSS"), Internet Protocol Multimedia Subsystem ("IMS"), IMS Application Reference Identifier ("IARI"), IMS Communication Service Identifier ("ICSI"), Internet Protocol ("IP"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), LTE Advanced ("LTE-A"), Medium Access Control ("MAC"), Multiple Access ("MA"), Mobile Broadband ("MBB"), Modulation Coding Scheme ("MCS"), Machine Type Communication ("MTC"), Massive MTC ("mMTC"), Massive Internet-of-Things ("mIoT"), Mobility Management ("MM"), Mobility Management Entity ("MME"), Multiple Input Multiple Output ("MIMO"), Multipath TCP ("MPTCP"), Multi User Shared Access ("MUSA"), Non-Access Stratum ("NAS"), Narrowband ("NB"), Network Function ("NF"), Network Slice Selection Function ("NSSF"), Network Slice Selection Policy ("NSSP"), Next Generation (e.g., 5G) Node-B ("gNB"), Next Generation Radio Access Network ("NG-RAN"), New Radio ("NR"), Orthogonal Frequency Division Multiplexing ("OFDM"), Policy Control & Charging ("PCC"), Policy Control Function ("PCF"), Policy Control and Charging Rules Function ("PCRF"), Packet Data Network ("PDN"), Protocol Data Unit ("PDU"), PDN Gateway ("PGW"), Public Land Mobile Network ("PLMN"), Quality of Service ("QoS"), Quadrature Phase Shift Keying ("QPSK"), Radio Access Network ("RAN"), Radio Access Technology ("RAT"), Radio Resource Control ("RRC"), Receive ("RX"), Single Carrier Frequency Division Multiple Access ("SC-FDMA"), Switching/Splitting Function ("SSF"), Scheduling Request ("SR"), Serving Gateway ("SGW"), Session Management Function ("SMF"), System Information Block ("SIB"), Transport Block ("TB"), Transport Block Size ("TBS"), Time-Division Duplex ("TDD"), Time Division Multiplex ("TDM"), Transmission and Reception Point ("TRP"), Transmit ("TX"), Uplink Control Information ("UCI"), Unified Data Management ("UDM"), User Data Repository ("UDR"), User Entity/Equipment (e.g., Mobile Terminal) ("UE"), Uniform Resource Name ("URN"), Uplink ("UL"), User Plane ("UP"), Universal Mobile Telecommunications System ("UMTS"), Ultra-reliability and Low-latency Communications ("URLLC"), and Worldwide Interoperability for Microwave Access ("WiMAX").

In wireless communications networks, next generation of wireless networks (e.g., fifth-generation or "5G" networks) are expected to support different network slices. Each network slice can be seen as an independent network partition optimized to support the performance requirements of a certain usage class. For example, a wireless communication network may contain a network slice optimized for mobile broadband services (characterized by high data rate and medium latency), a network slice optimized for autonomous driving (characterized by low latency and high reliability), a network slice optimized for Internet of Things ("IoT") or Machine Type Communications ("MTC") (characterized by low mobility and low data rate), and the like.

Generally, the same public land mobile network ("PLMN") deploys one or more network slices. A network slice may be deployed multiple times within a PLMN, resulting in multiple instances of the same network slice. It is expected that the same mobile device (e.g., User Equipment ("UE")) may simultaneously connect with multiple network slices. For example, a UE may be connected to a network slice optimized for massive IoT in order to provide connectivity to its IoT applications. Simultaneously, the same UE may be connected to another network slice optimized for mobile broadband communication in order to provide connectivity to its IMS and/or web browsing applications.

However, mobility management ("MM") signaling increases when the UE is simultaneously connected to multiple network slices. For example, when a UE is in idle mode and moves to new routing area (also referred to as a "tracking area," "registration area," or "paging area"), the UE needs to update its current location with all of the connected network slices. Conventional mobile communication networks would require the UE to perform multiple routing area updates, one towards each connected network slice. Performing multiple MM procedures results in increased MM signaling between the UE and the network and decreases the battery life in the UE.

BRIEF SUMMARY

Apparatuses for mobility management among multiple network slices are disclosed. Methods and systems also perform the functions of the apparatus.

One apparatus for mobility management among multiple network slices includes a processor that establishes a first connection with a primary network slice of a mobile communication network and establishes a second connection with a secondary network slice of the mobile communication network. The processor also detects a mobility management event and receives a mobility management response, via the first connection and in response to a mobility management request sent to the primary network slice. The mobility management response includes a response from the primary network slice and a response from the secondary network slice. In various embodiments, the apparatus may include a transceiver that communicates with the mobile communication network.

One method for mobility management among multiple network slices may include establishing a first connection with a primary network slice of a mobile communication network and establishing a second connection with a secondary network slice of the mobile communication network. The method may further include detecting a mobility management event and receiving, via the first connection and in response to a mobility management request sent over the first connection, a mobility management update response that includes a response from the primary network slice and a response from the secondary network slice.

Another apparatus for mobility management among multiple network slices includes a processor that receives an indication of an attached mobile unit attaching to a secondary network slice of the mobile communication network. The processor also receives a mobility management request from the mobile unit and forwards the mobility management request to the secondary network slice. In various embodiments, the apparatus may include a network interface for communicating over a mobile communication network.

Another method for mobility management among multiple network slices includes receiving an indication of an attached mobile unit attaching to a secondary network slice of the mobile communication network, receiving a mobility management request from the mobile unit, and forwarding the mobility management request to the secondary network slice.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
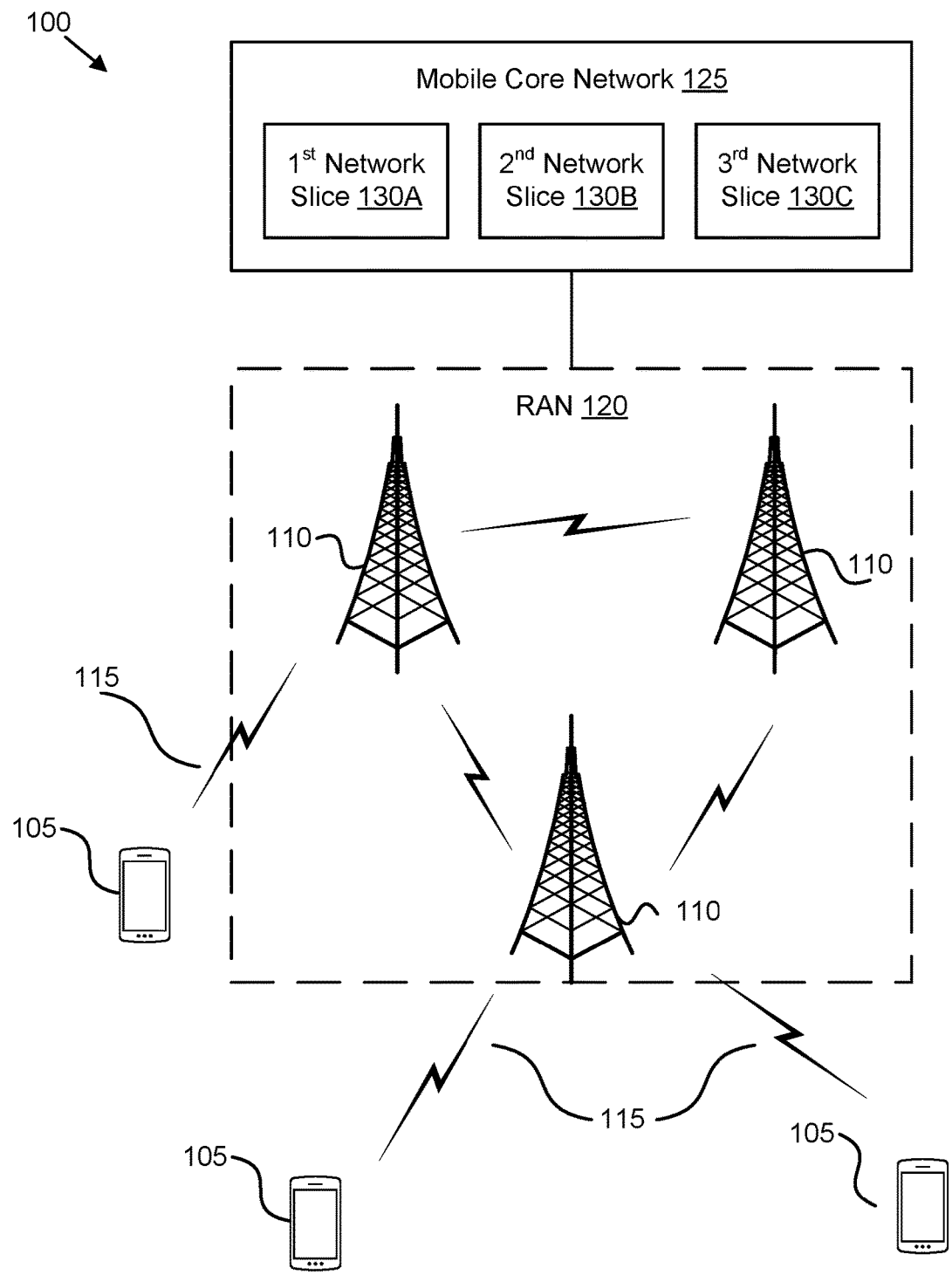
FIG. 1 is a schematic block diagram illustrating one embodiment of a wireless communication system for mobility management among multiple network slices.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures. Although various arrow types and line types may be employed in the flowchart and/or block diagrams, they are understood not to limit the scope of the corresponding embodiments.

The description of elements in each figure may refer to elements of proceeding figures. Like numbers refer to like elements in all figures, including alternate embodiments of like elements.

In order to support several 5G usage classes (e.g., application categories) simultaneously, a user equipment ("UE") may be configured to connect to multiple network slices simultaneously. Each network slice is optimized for a certain usage class. In order to minimize both the UE's battery consumption and the mobility management ("MM") signaling load between the UE and the network, the UE sends certain MM messages to a primary network slice and not to other connected network slices (e.g., secondary network slices). The primary network slice then relays the MM messages to the secondary network slices and collects MM responses from the secondary network slices. The primary network slice returns to the UE a single MM response message that contains MM responses from each network slice to which the UE is connected.

As used herein, a primary network slice refers to the network slice with which the UE first connects. The other network slice(s) with which the UE connects are referred to as secondary network slices. In certain embodiments, the UE attaches to the primary network slice using an Initial Attach procedure and attaches to the secondary network slices using an Additional Attach procedure, described in further detail below.

In order to minimize MM signaling, the UE sends routing area updates only to the primary network slice. As used herein, a "routing area" refers to a location area in the radio access network ("RAN"). The "routing area" may include one or more base stations (e.g., eNBs). When the UE detects it has changed routing area (e.g., while in Idle mode), the UE sends a Routing Area Update request to the primary network slice. A "routing area" may also be referred to as a "location area," "tracking area," "registration area," "paging area," or the like. As mentioned above, the primary network slice updates the secondary network slices with the UEs current routing area and delivers a consolidated Routing Area Update response (e.g., from all network slices with which the UE is connected).

FIG. 1 depicts an embodiment of a wireless communication system 100 for mobility management ("MM") among multiple network slices. In one embodiment, the wireless communication system 100 includes remote units 105, base units 110, and wireless communication links 115. Even though a specific number of remote units 105, base units 110, and wireless communication links 115 are depicted in FIG. 1, one of skill in the art will recognize that any number of remote units 105, base units 110, and wireless communication links 115 may be included in the wireless communication system 100.

The base units 110 form a radio access network ("RAN") 120. The RAN 120 is communicatively coupled to a mobile core network 125. The mobile core network 125 may be as a 5G packet core, such as the evolved packet core ("EPC") specified in LTE specifications. The present disclosure is not intended to be limited to the implementation of any particular wireless communication system architecture or protocol. Thus, in a non-LTE implementation, the RAN 120 may be coupled to a different type of packet core network, such as to a "5G" packet core network.

The mobile core network 125 belongs to a single public land mobile network ("PLMN") and includes a plurality of network slices 130A-C. Even though a specific number of network slices 130A-C are depicted in FIG. 1, one of skill in the art will recognize that any number of network slices may be included in the mobile network core 125. Each network slice in the mobile core network 125 may be optimized for a particular usage class. For example, a first network slice 130A may be optimized for mobile broadband services (e.g., optimized for high data rate and medium latency traffic), a second network slice 130B may be optimized for autonomous driving (e.g., optimized for low latency and high reliability traffic), and a third network slice 130C may be optimized for massive IoT/MTC (e.g., optimized for low mobility and low data rate traffic). Each optimized service provided by a network slice in the mobile core network 125 may correspond to a usage class. Further, two or more of the network slices 130A-C may be optimized for the same usage class (e.g., the mobile core network 125 may include multiple instances of a network slice 130A-C optimized for a particular usage class).

In one embodiment, the remote units 105 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art.

The base units 110 may serve a number of remote units 105 within a serving area, for example, a cell or a cell sector via a wireless communication link. The base units 110 may communicate directly with one or more of the remote units 105 via communication signals. The remote units 105 may communicate directly with one or more of the base units 110 via uplink ("UL") communication signals. Furthermore, the UL communication signals may be carried over the wireless communication links 115.

The base units 110 transmit downlink ("DL") communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 may communicate with one or more of the remote units 105 and/or one or more of the base units 110.

The base units 110 may be distributed over a geographic region. In certain embodiments, a base unit 110 may also be referred to as an access point, an access terminal, a base, a base station, a Node-B, an eNB, a Home Node-B, a relay node, a device, or by any other terminology used in the art. The base units 110 are generally part of a radio access network ("RAN") 120 that may include one or more controllers communicably coupled to one or more corresponding base units 110.

Typically, two or more geographically adjacent base units 110 are grouped together into a routing area. In certain embodiments, a routing area may also be referred to as a location area, a paging area, a tracking area, or by any other terminology used in the art. Each "routing area" has an identifier that is transmitted to the remote unit 105 from its serving base unit 110.

When the UE moves to a new cell (e.g., moved within range of a new base unit 110) that broadcasts a different "routing area" the remote unit 105 detects a change in routing area. The RAN 120, in turn, pages a UE in Idle mode only via the base units 110 in its current routing area. The RAN 120 contains a plurality of routing areas. As known in the art, the size of a routing area (e.g., the number base stations including in the routing area) may be selected to balance routing area update signaling load with paging signaling load.

The RAN 120 is generally communicably coupled to a core network (such as the mobile core network 125) and one or more network slices 130 within the core network. For example, the RAN 120 may be coupled to one or more control plane functions (e.g., a mobility management function and/or a session management function) and one or more user plane functions in each network slice instance 130. For example, one or more base units 110 may be communicably coupled to a mobility management entity ("MME"), a serving gateway ("SGW"), and/or a packet data network gateway ("PGW") belonging to each network slice 130A-C. The mobile core network 125 (or other core network) may be coupled to other networks, like the Internet and an IP Multimedia Subsystem ("IMS"), among other networks. The mobile core network 125 may include controllers and gateways, which not illustrated, but are known generally by those having ordinary skill in the art.

In one implementation, the wireless communication system 100 is compliant with the long-term evolution ("LTE") of the 3GPP protocol, wherein the base unit 110 transmits using an orthogonal frequency division multiplexing ("OFDM") modulation scheme on the DL and the remote units 105 transmit on the UL using a single-carrier frequency division multiple access ("SC-FDMA") scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

In one embodiment, a remote unit 105 may attach to a first network slice 130A (e.g., a primary network slice) and to a second network slice 130B (e.g., a secondary network slice). Network attach procedures are discussed in detail below with reference to FIG. 5. When the remote unit 105 detects a MM event (e.g., a change in routing area), the remote unit 105 may transmit a MM request message only to its primary network slice (e.g., the first network slice 130A). Thereafter, the primary network slice forwards the MM request to one or more secondary network slices with which the remote unit 105 is attached. Because the remote unit 105 transmits the MM request messages to only the primary network slice, MM signaling between the remote unit 105 and the base units 110 is reduced and battery life of the remote unit 105 is improved.

The first network slice 130A may store a list of secondary network slices for each remote unit 105 for which it is the primary network slice. Each network slice 130A-C may have a slice identifier, which uniquely identifies the network slice 130A-C. When the remote unit 105 attaches to the second network slice 130B, the remote unit 105 may transmit to the second network slice 130B an additional attach request that includes the slice identifier belonging to its primary network slice (e.g., the first network slice 130A). In some embodiments, the slice identifier is included in a temporary UE identifier assigned to the remote unit 105 by the first network slice 130A. The second network slice 130B may identify the primary network slice using this identifier and transmit its own slice identifier to the primary network slice, thereby notifying the primary network slice that the second network slice 130B is a secondary network slice for the remote unit 105.

At some point, the remote unit 105 may no longer need the services of a network slice (e.g., one of network slices 130A-C). For example, the remote unit 105 may no longer have traffic to send that belongs to a usage class supported by the network slice. In such circumstances, the remote unit 105 may send a detach request message, such as a data connection release message, to detach from the network slice. When the remote unit 105 detaches from a secondary network slice, the secondary network slice (e.g., the second network slice 130B) informs the primary network slice (e.g., the first network slice 130A) which then ceases transmitting further MM requests to the secondary network slice.

Where the remote unit 105 detaches from a primary network slice, the primary network slice selects a secondary network slice to become the new primary network slice. The old primary network slice then sends slice identities of all network slices with which the remote unit 105 is attached and sends a detach response to the remote unit 105. In some embodiments, the detach response includes the slice identifier of the new primary network slice (e.g., included in a new temporary UE identifier for the remote unit 105) so that the remote unit 105 knows where to send future MM requests.

Figures 2, 3:
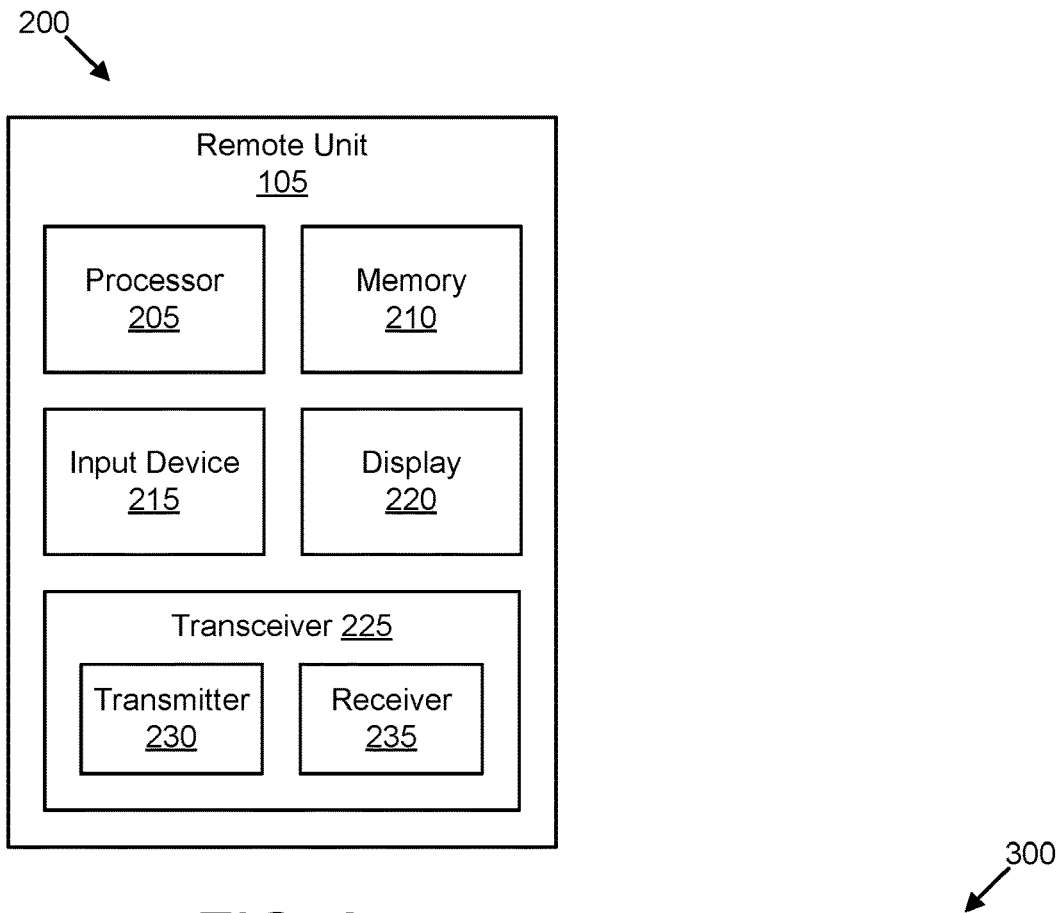
FIG. 2 is a schematic block diagram illustrating one embodiment of an apparatus that may be used for mobility management among multiple network slices.
FIG. 3 is a schematic block diagram illustrating another embodiment of an apparatus that may be used for mobility management among multiple network slices.

FIG. 2 depicts one embodiment of an apparatus 200 that may be used for mobility management ("MM") among multiple network slices. The apparatus 200 includes one embodiment of the remote unit 105. Furthermore, the remote unit 105 may include a processor 205, a memory 210, an input device 215, a display 220, and a transceiver 225. In some embodiments, the input device 215 and the display 220 are combined into a single device, such as a touchscreen. In certain embodiments, the remote unit 105 may not include any input device 215 and/or display 220. In various embodiments, the remote unit 105 may include one or more of the processor 205, the memory 210, and the transceiver 225, and may not include the input device 215 and/or the display 220.

The processor 205, in one embodiment, may include any known controller capable of executing computer-readable instructions and/or capable of performing logical operations. For example, the processor 205 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 205 executes instructions stored in the memory 210 to perform the methods and routines described herein. The processor 205 is communicatively coupled to the memory 210, the input device 215, the display 220, and the transceiver 225.

In certain embodiments, the processor 205 may control the transceiver 225 to establish a first connection with a first network slice 130A and a second connection with a second network slice 130B. In some embodiments, the first connection is a signaling connection, rather than a data connection, between the remote unit 105 and the first network slice 130A. Similarly, the second connection may be a signaling connection (not a data connection) between the remote unit 105 and the second network slice 130B. Establishing the first connection may include performing an Initial Attach procedure with the first network slice 130A, wherein the first network slice 130A becomes the primary network slice for the remote unit 105. Establishing the second connection may include performing an Additional Attach procedure with the second network slice 130B, wherein the second network slice 130B becomes a secondary network slice for the remote unit 105. Thus, signaling connections with the first network slice 130A and the second network slice 130B may be established via network attachment with the first network slice 130A and the second network slice 130B.

The processor 205 may also monitor a routing area identifier received from the base units 110 with which the remote unit 105 communicates wirelessly. The processor 205 may detect the change in routing area, thus detecting a mobility management event ("MM event"). As used herein, a MM event refers to an event requiring the remote unit 105 to communicate a MM message with the mobile communication network. Examples of detecting a MM events include, but are not limited to, detecting a change in routing area, expiration of the timer for periodic location update, receiving a paging message, an application on the remote unit 105 generating uplink data, and the like.

In response to the MM event, the processor 205 may generate a MM request message that corresponds to the MM event. For example, the processor 205 may generate a Routing Area Update request in response to detecting a change in routing area and/or expiration of the timer for periodic location update. The processor 205 may then control the transceiver 225 to send the MM request message to only the primary network slice (e.g., over the signaling connection (first connection) with the primary network slice). The processor 205 may further receive a MM response message from the primary network slice, the MM response message including a response from the primary network slice and have response from each secondary network slice with which the remote unit 105 is attached.

The memory 210, in one embodiment, is a computer readable storage medium. In some embodiments, the memory 210 includes volatile computer storage media. For example, the memory 210 may include a RAM, including dynamic RAM ("DRAM"), synchronous dynamic RAM ("SDRAM"), and/or static RAM ("SRAM"). In some embodiments, the memory 210 includes non-volatile computer storage media. For example, the memory 210 may include a hard disk drive, a flash memory, or any other suitable non-volatile computer storage device. In some embodiments, the memory 210 includes both volatile and non-volatile computer storage media.

In some embodiments, the memory 210 stores data relating to MM among multiple network slices. For example, the memory 210 may store a UE identity (e.g., a temporary identity for the remote unit 105), securities, the current routing area, and the like. In some embodiments, the memory 210 also stores program code and related data, such as an operating system or other controller algorithms operating on the remote unit 105.

The input device 215, in one embodiment, may include any known computer input device including a touch panel, a button, a keyboard, a stylus, a microphone, or the like. In some embodiments, the input device 215 may be integrated with the display 220, for example, as a touchscreen or similar touch-sensitive display. In some embodiments, the input device 215 includes a touchscreen such that text may be input using a virtual keyboard displayed on the touchscreen and/or by handwriting on the touchscreen. In some embodiments, the input device 215 includes two or more different devices, such as a keyboard and a touch panel.

The display 220, in one embodiment, may include any known electronically controllable display or display device. The display 220 may be designed to output visual, audible, and/or haptic signals. In some embodiments, the display 220 includes an electronic display capable of outputting visual data to a user. In some embodiments, all or portions of the display 220 may be integrated with the input device 215. For example, the input device 215 and display 220 may form a touchscreen or similar touch-sensitive display. In other embodiments, the display 220 may be located near the input device 215.

For example, the display 220 may include, but is not limited to, an LCD display, an LED display, an OLED display, a projector, or similar display device capable of outputting images, text, or the like to a user. As another, non-limiting, example, the display 220 may include a wearable display such as a smart watch, smart glasses, a heads-up display, or the like. Further, the display 220 may be a component of a smart phone, a personal digital assistant, a television, a table computer, a notebook (laptop) computer, a personal computer, a vehicle dashboard, or the like.

The transceiver 225 communicates with the mobile communication network supporting a plurality of usage classes via a plurality of network slices. Specifically, the transceiver 225 may communicate simultaneously with two or more network slices via a RAN 120. The transceiver 225 comprises a transmitter 230 used to provide UL communication signals to the base unit 110 and a receiver 235 is used to receive DL communication signals from the base unit 110. In one embodiment, the transceiver 225 is used to request a network attachment for particular usage class. For example, the transmitter 230 may request a network attachment associated with a usage class by transmitting an initial attach request message to a base unit 110 in the RAN 120, wherein the base unit 110 forwards the initial attach request message to a network slice (e.g., one of the network slices 130A-C) based on the indicated usage class. The receiver 235 may later receive an initial attach response message from the network slice via the base unit 110.

Although only one transmitter 230 and one receiver 235 are illustrated, the transceiver 225 may include any suitable number of transmitters 230 and receivers 235. The transmitter 230 and the receiver 235 may be any suitable type of transmitters and receivers. For example, in some embodiments, the transceiver 225 includes a plurality of transmitter 230 and receiver 235 pairs for communicating on a plurality of wireless networks and/or radio frequency bands, each transmitter 230 and receiver 235 pair configured to communicate on a different wireless network and/or radio frequency band than the other transmitter 230 and receiver 235 pairs.

FIG. 3 depicts another embodiment of an apparatus 300 that may be used for mobility management ("MM") among multiple network slices. The apparatus 300 includes a network slice 301. In some embodiments, the network slice 301 may be an embodiment of any one of the network slices 130A-C, described above with reference to FIG. 1. Furthermore, the network slice 301 may include a processor 305, a memory 310, an input device 315, a display 320, an NGs interface 325, and a network interface 330. In certain embodiments, the depicted components 305-330 may be distributed (geographically and/or logically) among a number of entities, controller, and the like.

As may be appreciated, the processor 305, the memory 310, the input device 315, and the display 320 may be substantially similar to the processor 205, the memory 210, the input device 215, and the display 220 of the remote unit 105, respectively. In certain embodiments, the processor 305 may be used to attach with a remote unit 105. In one embodiment, the processor 305 attaches with the remote unit 105 using an Initial Attach procedure, in which the network slice 301 becomes a primary network slice for the remote unit 105. In another embodiment, the processor 305 attaches with the remote unit 105 using an Additional Attach procedure, in which the network slice 301 becomes a secondary network slice for the remote unit 105.

Where the network slice 301 is a primary network slice for a remote unit 105, the processor 305 may receive an indication of the remote unit 105 attaching to a secondary network slice. For example, the processor 305 may receive a re-authentication request for the remote unit 105 via the secondary network slice. The processor 305 may further receive a MM request from the mobile unit 105 and forward the MM request to the secondary network slice. Where the network slice 301 is a secondary network slice for the remote unit 105, the processor 305 may receive a MM request for a remote unit 105 that is forwarded from a primary network slice.

The processor 305 may further generate a MM response message. The MM response message may include a response for each usage class supported by the network slice 301. Where the network slice 301 is a secondary network slice, the processor 305 may forward (e.g., via the NGs interface 325) the MM response message to the primary network slice. Where the network slice 301 is a primary network slice, the processor 305 may receive a MM response message from a secondary network slice and generate a new MM response message that contains a response from the primary network slice and responses from each secondary network slice with which the remote unit is attached.

The NGs interface 325, in one embodiment, is configured to communicate with another network slice in the mobile communication network. For example, where the network slice 301 is a primary network slice, it may forward a MM request message to one or more secondary network slices via the NGs interface 325. As another example, where the network slice 301 is a secondary network slice, it may register itself with a primary network slice via the NGs interface 325. In one embodiment, a secondary network slice registers with the primary network slice by forwarding a re-authentication request from a remote unit 105 to the primary network slice.

The network interface 330, in one embodiment, is configured to communicate with the remote unit 105 via the RAN 120. In one embodiment, the network interface 330 establishes network connections with one or more base units 110 within the RAN 120. For example, the network interface 330 may receive a MM request message from a remote unit 105 and transmit a MM response message back to the remote unit 105. In various embodiments, the MM request message may be an Initial Attach Request, an Additional Attach Request, a Routing Area Update request, and/or a Service Request. In such embodiments, the corresponding MM response message may be an Initial Attach Response, an Additional Attach Response, a Routing Area Update response, or a Service Response.

Figure 4:
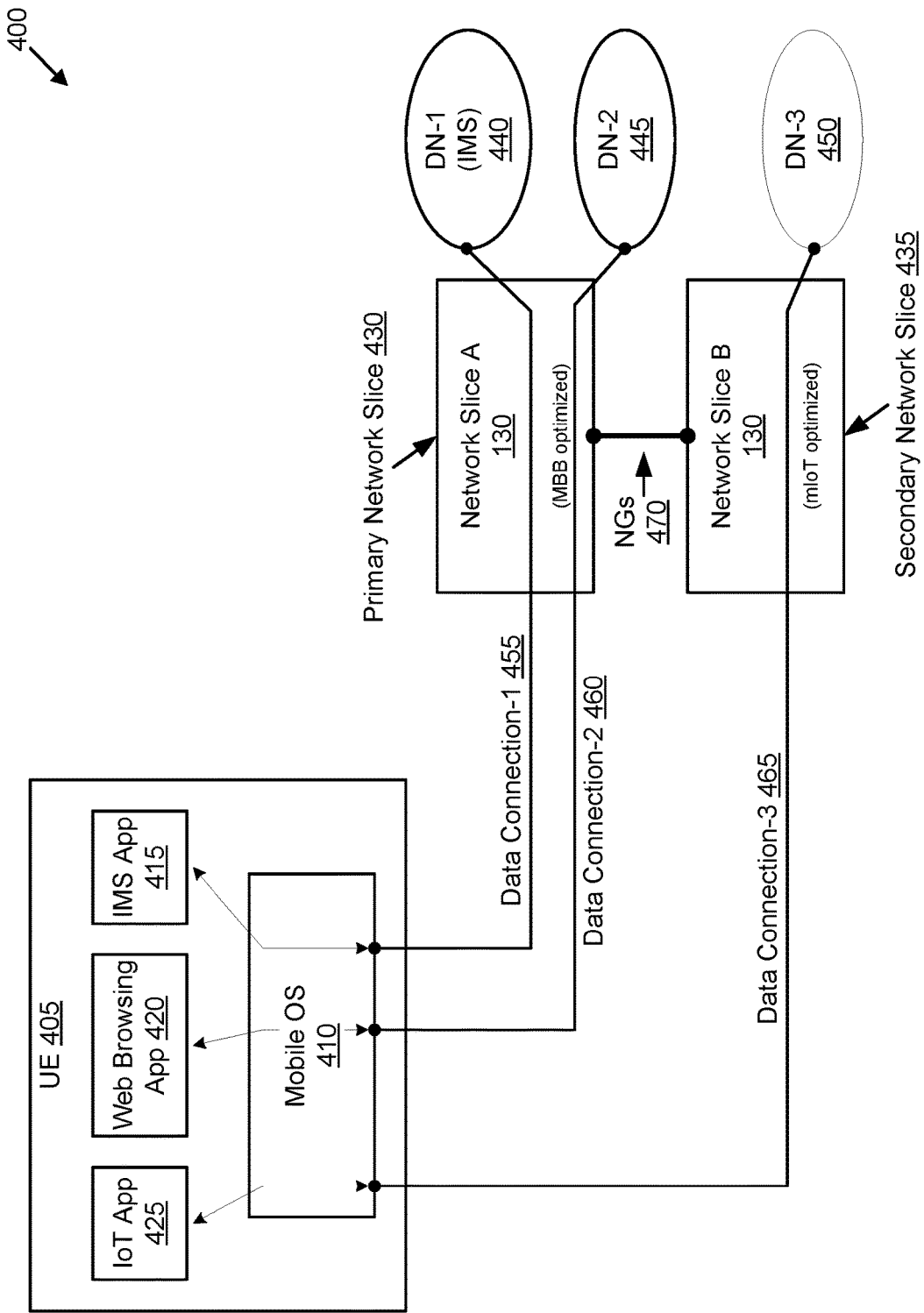
FIG. 4 illustrates one embodiment of a network attach procedure used for mobility management among multiple network slices.

FIG. 4 illustrates one embodiment of a wireless communication system 400 used for mobility management ("MM") among multiple network slices. In the illustrated embodiment, the wireless communication system 400 includes a UE 405 in communication with both a primary network slice 430 and a secondary network slice 435. In certain embodiments, the UE 405 may be one embodiment of the remote unit 105. In certain embodiments, the actions of the UE 405 are performed by the processor 205 discussed above with reference to FIG. 2. In some embodiments, the network slices 430-435 may each be an embodiment of the network slice 301 discussed above with reference to FIG. 3. In certain embodiments, the actions of the network slices 430-435 are performed by the processor 305 discussed above with reference to FIG. 3.

The UE 405 includes a mobile operating system ("OS") 410 and a plurality of applications executing on the UE 405. These applications include an IMS application 415, a web browsing application 420, and an IoT application 425. Here, the primary network slice 430 is a first network slice instance optimized for MBB traffic and the secondary network slice 435 is a second network slice instance optimized for massive IoT ("mIoT") traffic. Each network slice 430-435 may support one or more usage classes.

In response to the IMS 415 application requesting a network connection, the mobile OS 410 establishes a first data connection 455 with a first data network ("DN") 440 via a first network slice instance, here the primary network slice 430. As depicted, the primary network slice 430 supports a first usage class corresponding to the IMS application 415. Prior to establishing the first data connection 455, the UE 405 attaches to the first network slice instance (e.g., the primary network slice 430) in order to establish a data connection 455. The primary network slice 430 is designated as a "primary" network slice because it is the first network slice to which the UE 405 attaches. The primary network slice 430 performs a primary role in mobility management, as discussed in further detail below.

In response to the web browsing application 420 requesting a network connection, the mobile OS 410 establishes a second data connection 460 with a second data network 445. In one embodiment, the second data connection 460 corresponds to a different usage class than the first data connection 455. Here, the primary network slice 430 also supports the second usage class corresponding to the web browsing application 420. Alternatively, the usage classes corresponding to the web browsing application 420 and to the IMS application 415 may be the same. Because the UE 405 is already attached to the primary network slice 430 and because the primary network slice 430 supports a usage class corresponding to the web browsing application 420, the UE 405 is able to establish the second data connection 460 without attaching to another network slice.

In response the IoT application 425 requesting a network connection, the mobile OS 410 establishes a third data connection 465 with a third DN 450. Because the primary network slice 430 does not support a usage class corresponding to the IoT application 425, the UE 405 attaches to a secondary network slice 435 that supports a third usage class corresponding to the IoT application 425 before forming the third data connection 465. The secondary network slice 435 is designated as a "secondary" network slice because the UE 405 is already attached to a "primary" network slice. The secondary network slice 435 performs a secondary role in mobility management, as discussed in further detail below.

Accordingly, the UE 405 may be simultaneously connected to (or attached to) both the primary network slice 430 and to the secondary network slice 435. Further, the UE 405 may be connected to different data networks 440-450 via different the network slices 430-435. In the illustrated embodiment, separate data connections 455-465 are established for each application 415-425, allowing each application 415-45 to communicate with a different data network 440-450 via a network slice that can best support the application traffic.

When the UE 405 determines the need to send a MM message to all attached network slices, the UE 405 sends the mobility management message only to the primary network slice 430. For example, in response to the UE 405 determining that it has changed routing area, the UE 405 sends a mobility management message updating its current location only to the primary network slice 430. The primary network slice 430, in turn, sends the updated location to the secondary network slice 435.

In some embodiments, the mobility management message sent by the UE 405 requires a response from the network slices 430-435. Accordingly, each network slice 430-435 may generate a MM response. Further, the secondary network slice 435 may transmit its response message to the primary network slice 430, wherein the primary network slice 430 consolidates its own response message with the response message received from the secondary network slice 435. The primary network slice 430 may then send a single (consolidated) MM response message to the UE 405, as discussed below with reference to FIG. 5.

The mobile communication system 400 also includes an interface 470 (e.g., a NGs interface) between the network slices 430-435. The NGs interface 470 facilitates inter-slice communication between the primary network slice 430 and the secondary network slice 435. While the depicted embodiment shows a single secondary network slice 435, in other embodiments the wireless communication system 400 may include two or more secondary network slices 435. In such embodiments, the primary network slice 430 and the plurality of secondary network slices 435 would communicate over the NGs interface 470.

The primary network slice 435 uses the NGs interface 470 to communicate MM information relating to the UE 405 to the secondary network slice(s) 435. In the above example, the primary network slice 430 transmits the MM message updating the UE 405 location to the secondary network slice(s) 435 over the NGs interface 470. In further embodiments, the NGs interface 470 may also be used for authenticating the UE 405 when the UE 405 attaches to a secondary slice, as discussed in further detail below.

Figure 5:
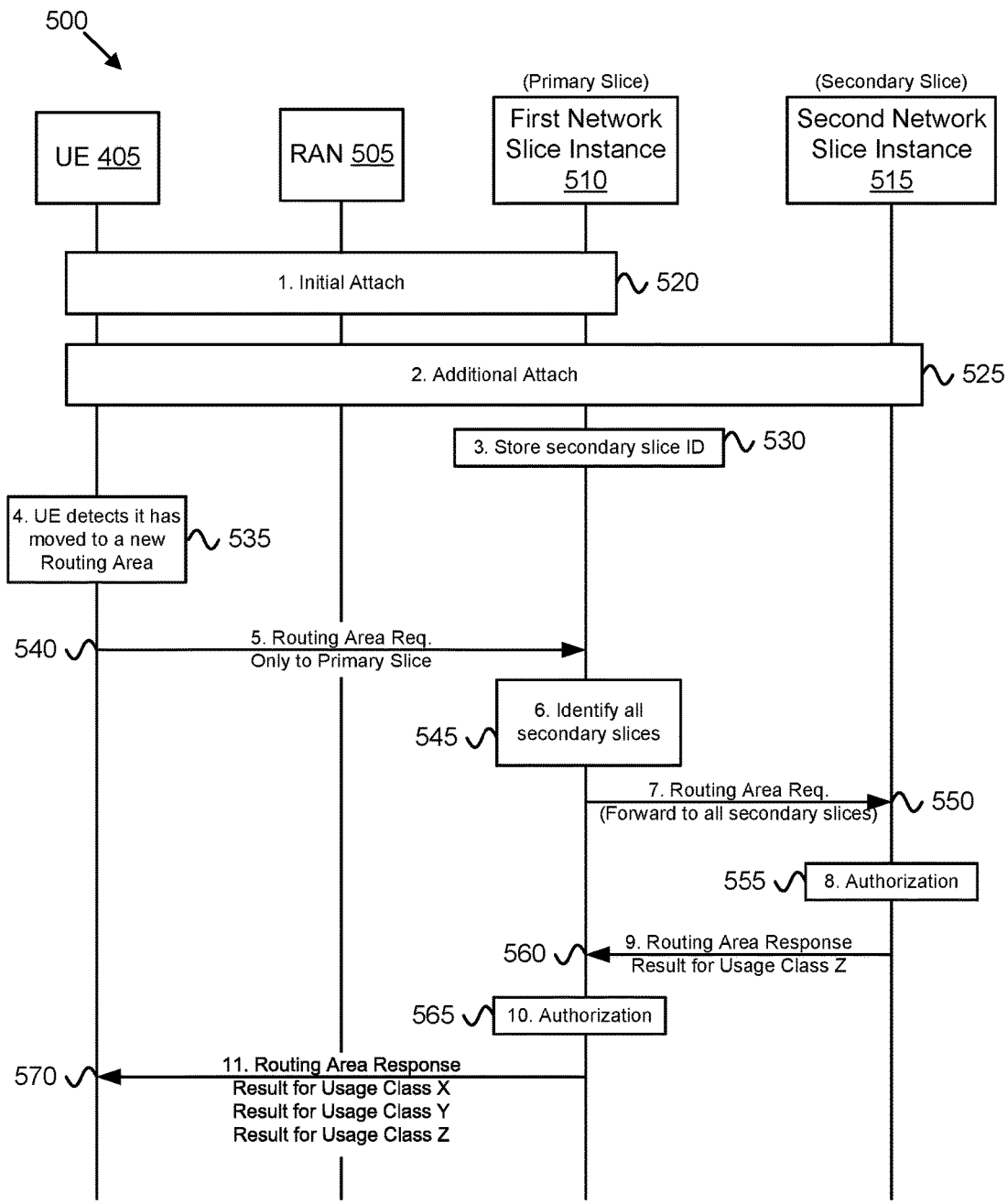
FIG. 5 illustrates another embodiment of a network attach procedure used for mobility management among multiple network slices.

FIG. 5 illustrates one embodiment of a location management procedure 500 used for mobility management ("MM") among multiple network slices. In the illustrated embodiment, communication with a UE 405, a RAN 505, a first network slice instance 510, and a second network slice instance 515 are illustrated. The UE 405 may be substantially similar to the UE 405 described above with reference to FIG. 4. Additionally, the RAN 505 and the network slice instances 510-515 may be substantially similar as the RAN 120 and network slices 130 described above with reference to FIG. 1. The location management procedure 500 demonstrates how the UE 405 updates its current routing area with the network slice instances 510-515. Each network slice instance 510-515 needs to know the current routing area of the UE 405 in order to initiate paging when mobile-terminated services are to be delivered to the UE 405.

The location management procedure 500 begins with the UE 405 attaching 520 to the first network slice instance 510 using an initial attach procedure. Note that the UE 405 communicates with the first network slice instance 510 via the RAN 505. In response to the initial attachment to the first network slice instance 510, the first network slice instance 510 becomes the primary network slice 430. The first network slice instance 510 provides service to the UE 405 for at least one usage class.

Here, the first network slice instance 510 supports a "Usage Class X" and a "Usage Class Y." The Usage Class X may correspond to a mobile broadband ("MBB") or general application usage class (e.g., having high data rate and medium latency) and the Usage Class Y may correspond to a mission-critical usage class (e.g., having low latency and high reliability). In certain embodiments, an IMS application 415 and a web browsing application 420 at the UE 405 each have a required usage class corresponding to Usage Class X.

Additionally, the UE 405 attaches 525 to the second network slice instance 515 using an additional attach procedure. Note that the UE 405 communicates with the second network slice instance 515 via the RAN 505. In response to the additional attachment, the second network slice instance 515 becomes a secondary network slice 435. The second network slice instance 515 provides service to the UE 405 for at least one usage class. Here, the second network slice instance 515 supports a "Usage Class Z" which may correspond to a massive IoT or infrequent messaging application usage class (e.g., having low mobility and low data rate). The initial attach procedure and additional attach procedure are described in detail below, with reference to FIG. 6.

During the additional attach procedure, the first network slice instance 510 learns and stores 530 the identity of the second network slice instance 515. In one embodiment, the first network slice instance 510 stores a correspondence table of served UEs and secondary network slices corresponding to each served UE. In one embodiment, the first network slice instance 510 stores a slice identifier belonging to the second network slice instance 515. The slice identifier may be resolvable into a network address of the second network slice instance 515, such as an IP address. The first network slice instance 510 may use the resolved network address to communicate with the second network slice instance 515 (e.g. via the NGs interface 470).

At some point, the UE 405 detects 535 that it has moved to a new routing area and needs to update the network (e.g., the network slice instances 510-515). In some embodiments, the UE 405 is in Idle mode when it determines that it is in the new routing area and needs to update its location with the network. Instead of updating separately the first network slice instance 510 and the second network slice instance 515, the UE 405 updates only the primary network slice, here the first network slice instance 510.

In some embodiments, the UE 405 sends 540 a Routing Area Update request message to the first network slice instance 510. In certain embodiments, the Routing Area Update request message is encoded using a security key generated during the initial attach. The first network slice instance 510 receives the Routing Area Update request and identifies 545 the secondary network slices of the UE 405 (here the second network slice instance 515). In one embodiment, the first network slice instance 510 references a correspondence table storing slice identifiers for each secondary network slice with which the UE 405 is attached.

After identifying the secondary network slices of the UE 405, the first network slice instance 510 forwards 550 the routing area request message to each secondary network slice of the UE 405. In the depicted embodiment, the first network slice instance 510 forwards 550 the Routing Area Update request message to the second network slice instance 515. As discussed above with reference to FIG. 4, the first network slice instance 510 may communicate with the second network slice 515 using a NGs interface 470.

The secondary network slice (here the second network slice instance 515) determines 555 whether the UE 405 is authorized to receive services in the new routing area. For example, where the second network slice instance 515 supports a "Usage Class Z," the second network slice instance 515 determines whether the UE 405 is authorized (e.g. based on its subscription) to receive service for the Usage Class Z. Each secondary network slice (here only the second network slice instance 515) determines whether the UE is authorized to receive services for each usage class supported by the secondary network slice.

Having determined whether the UE 405 is authorized to receive services in the new routing area, each secondary network slice (e.g., the second network slice instance 515) sends 560 a Routing Area Update response message to the primary network slice e.g., the first network slice instance 510). The Routing Area Update response message from each secondary network slice indicates whether the routing area update was accepted by the secondary network slice for each usage class supported by the secondary network slice. Here, the second network slice instance 515 sends a Routing Area Update response message to the first network slice instance 510, the Routing Area Update response message indicating that the UE 405 is authorized to receive services in the new routing area for the Usage Class Z.

The primary network slice (here the first network slice instance 510) also determines 565 whether the UE 505 is authorized to receive services in the new routing area. The primary network slice determines whether the UE 405 is authorized to receive service for each usage class supported by the primary network slice. Here, the first network slice instance 510 determines whether the UE 405 is authorized to receive service in the new routing area for both the Usage Class X and the Usage Class Y.

Having determined whether the UE 405 is authorized to receive services in the new routing area, the primary network slice (e.g., the first network slice instance 510) compiles the responses from all network slices to which the UE 405 is attached. Accordingly, the primary network slice generates a Routing Area Update response message that contains results of the Routing Area Update request for each usage class with which the UE 405 is attached. Here, the first network slice instance 510 transmits 570 a Routing Area Update response message containing results of the Routing Area Update request for each of the usage classes X, Y, and Z. The UE 405 stores these results and determines if it can use data services for usage classes X, Y, and Z in the new routing area.

In the embodiments of FIG. 5, the first network slice instance 510 is the primary network slice 430 because it is the first slice to which the UE 405 attaches. In other embodiments, the UE 405 may attach first to the network slice instance that supports the usage class of the IoT application 425 (here the second network slice instance 515). In such embodiments, the second network slice instance 515 optimized for IoT traffic (e.g., "Usage Class Z") would be the primary network slice 430 and the first network slice instance 510 optimized for MBB traffic (e.g., "Usage Class X") would be the secondary network slice 435.

Figure 6:
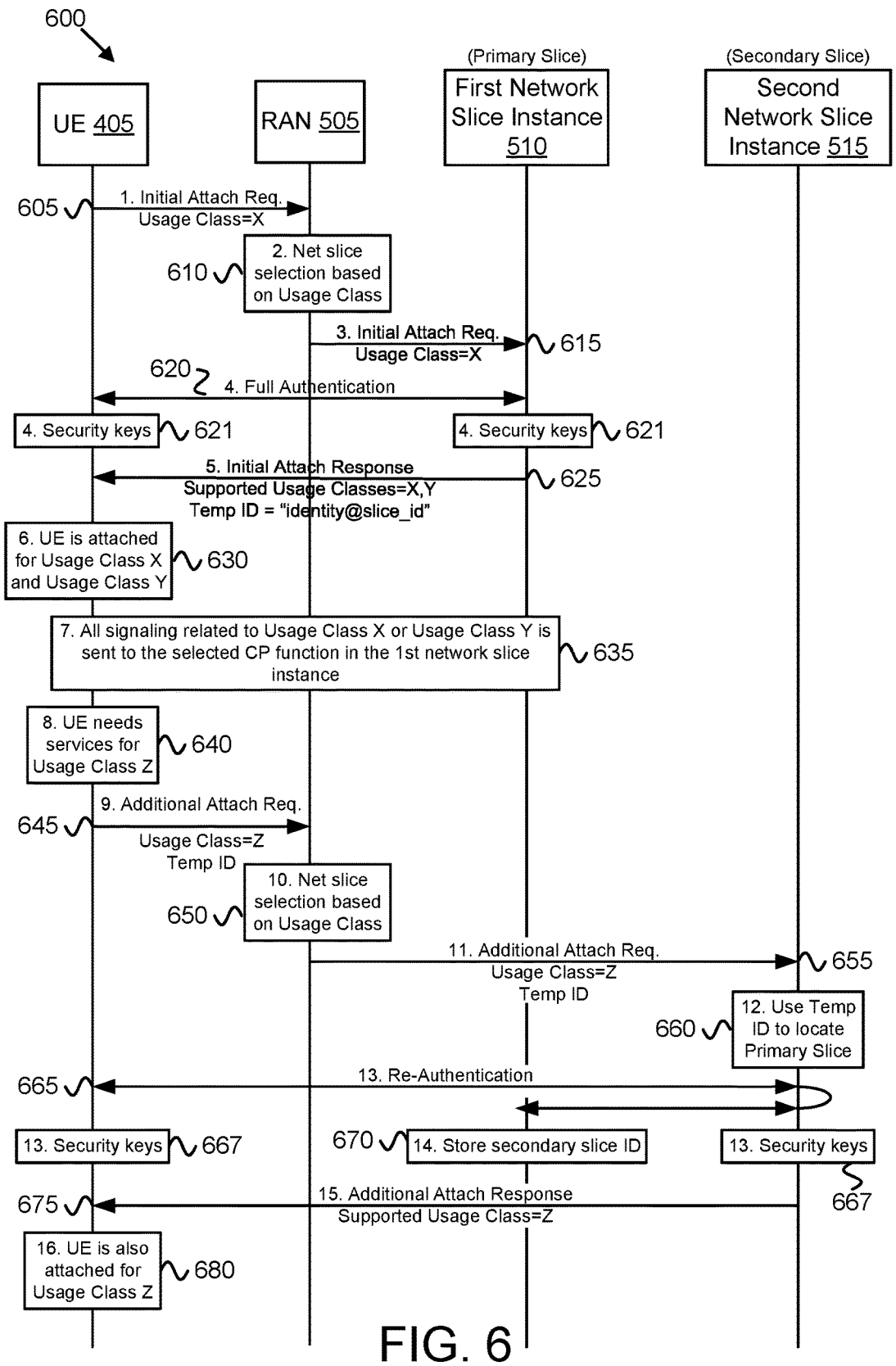
FIG. 6 illustrates one embodiment of a network attach procedure used for mobility management among multiple network slices.

FIG. 6 illustrates one embodiment of a network attach procedure 600 used for mobility management ("MM") among multiple network slices. In the illustrated embodiment, communication with a UE 405, a RAN 505, a primary network slice 510, and a secondary network slice 515 are depicted. The UE 405 may be substantially similar to the UE 405 described above with reference to FIGS. 4-5. Additionally, the RAN 505, first network slice instance 510, and the second network slice network instance 515 may be substantially similar as those described above with reference to FIG. 5. The network attach procedure 600 demonstrates how the UE 405 attaches to a primary network slice 430 and to one or more secondary network slices 435. It is assumed that the UE 405 is not attached to any network slice prior to implementing the network attach procedure 600.

The network attach procedure 600 begins with the UE 405 determining that it needs to provide data services for a specific usage class, here "Usage Class X" For example, the IMS application 415 in the UE 405 may request network connectivity and the UE 405 may associate the IMS application 415 with the Usage Class X. Responsive to detecting the need to provide data services for Usage Class X, the UE 405 sends 605 an Initial Attach Request message to the RAN 505. The Initial Attach Request message includes a parameter specifying that the required usage class is Usage Class X.

The Radio Access Network 505 receives the Initial Attach Request message and, utilizing the received usage class, selects 610 a network slice instance that supports the required usage class, here Usage Class X. The RAN 505 then forwards 615 the Initial Attach Request message to the selected network slice instance, here the first network slice instance 510.

The first network slice instance 510 authenticates 620 the UE 405 in response to receiving the Initial Attach Request message. In one embodiment, the first network slice instance 510 and the UE 405 perform a full mutual authentication procedure. If successful, the UE 405 and the first network slice instance 510 generate security keys 623. The security keys 623 may then be used to protect signaling messages between the UE 405 and the first network slice instance 510.

Having authenticated the UE 405, the first network slice instance 510 responds 625 to the Initial Attach Request message with an Initial Attach Response message. The Initial Attach Response message includes a list of usage classes supported by the first network slice instance 510. Here, the first network slice instance 510 supports both the "Usage Class X" as well as a second usage class "Usage Class Y." The Initial Attach Response attaches the UE 405 to the first network slice instance 510 for all usage classes supported by the first network slice instance 510.

The Initial Attach Response message further includes a temporary identity for the UE 405. The temporary identity includes a slice identifier that uniquely identifies the first network slice instance 510, that is, the slice identifier identifies the slice instance that generates the temporary identity. An exemplary temporary identity is "identity@slice_id" where "slice_id" is the slice identifier of the first network slice instance 510.

In some embodiments, the Initial Attach Response message also includes an identity for the Control Plane ("CP") function in the first network slice instance 510 which is assigned to serve the UE 405. The assigned CP function may also be referred to as the "serving" CP function for the UE 405. Although not depicted here, each network slice instance may include one or more CP functions. The UE 405 sends all signaling messages relating to the usage classes supported by the first network slice instance 510 (e.g., Usage Class X and Usage Class Y) to its serving CP function in first network slice instance 510 by including the CP function identity in these messages. For example, the UE 405 may send a request to establish a PDU session for Usage Class Y to the serving CP function.

At this point, the UE 405 is now attached 630 for Usage Class X and Usage Class Y. These usage classes are supported by the first network slice instance 510. Because the UE 405 was not attached to another network slice instance when it attached to the first network slice instance 510, the first network slice instance 510 becomes the primary network slice (e.g., the primary network slice 430). The UE 405 sends 635 all signaling messages relating to Usage Class X and Usage Class Y to the first network slice instance 510 (e.g., to the serving CP function in the first network slice instance 510). Note that the UE 405 does not need to attach again to the first network slice instance 510 before establishing a data connection for data services for Usage Class Y.

At some time, the UE 405 determines 640 that it needs to provide data services for Usage Class Z, which is not supported by the first network slice instance 510. For example, an IoT application 425 in the UE 405 may request data connectivity. The UE 405 may associate the IoT application 425 with the Usage Class Z. The UE 405 may further determine that its current attachment status does not support Usage Class Z. Here, the UE 405 is attached to the first network slice instance 510; however, the first network slice instance 510 does not support Usage Class Z.

Accordingly, the UE 405 sends 645 an Additional Attach Request message to the RAN 505 in order to attach for Usage Class Z. The Additional Attach Request message is used to attach to an additional (e.g., second, third, etc.) network slice instance after the UE 405 is already attached to a primary network slice (here the first network slice instance 510). Similar to the Initial Attach Request message, the Additional Attach Request message includes a parameter specifying the required usage class, here Usage Class Z. Note that the UE 405 does not know (and does not need to know) which network slices support the Usage Class Z. Rather, the UE 405 relies on the RAN 505 to know which network slices support the various usage classes.

As before, the RAN 505 selects 650 a network slice instance based on the required usage class in the Additional Attach Request message (e.g., Usage Class Z). Here, the RAN 505 selects the second network slice instance 515, which supports the Usage Class Z. Accordingly, the RAN 505 forwards 655 the Additional Attach Request message to the second network slice instance 515. In one embodiment, the RAN 505 forwards the Additional Attach Request message to a CP function in the second network slice instance 515. The forwarded Additional Attach Request message may include the required usage class parameter to attach the UE 405 to the second network slice instance 515 for a specific usage, in situations where the second network slice instance 515 supports more than one usage class.

In some embodiments, the Additional Attach Request message also includes the temporary identity assigned to the UE 405 by the first network slice instance 510. The second network slice instance 515 uses the received temporary identity to determine 660 the primary network slice for the UE 405. Here, the slice identifier in the temporary identity indicates the first network slice instance 510.

In one embodiment, the second network slice instance 515 may use a DNS service to resolve the slice identifier (here "slice_id") into a network address (e.g., IP address) of the first network slice instance 510. In some instances, the network address is used to communicate with a CP function in the first network slice instance 510 (e.g., the serving CP function of the UE 405). As discussed with reference to FIG. 4, the second network slice 515 may communicate with the first network slice instance 510 using a NGs interface 470.

The second network slice instance 515 authenticates 665 with the UE 405. In the depicted embodiment, the second network slice instance 515 initiates a mutual re-authentication procedure between the UE 405 and its primary network slice (the first network slice instance 510) via the second network slice instance 515. Advantageously, re-authentication is typically quicker than full authentication. As a result of the re-authentication, the UE 405 and the first network slice instance 510 generate new security keys. The first network slice instance 510 provides a master key to the second network slice instance 515, which is used by the second network slice instance 515 to generate security keys 667 used to protect signaling messages between the UE 405 and the second network slice instance 515. The same master key and security keys 667 are also generated in the UE 405.

In response to the re-authentication, the first network slice instance 510 recognizes that the UE 405 has attached to a secondary network slice (here the second network slice instance 515). The first network slice instance 510 stores 670 the identity of the secondary network slice (e.g., a slice identifier belonging to the second network slice instance 515) for future use. In some embodiments, the second network slice instance 515 sends its identity to the first network slice instance 510 within the re-authentication signaling.

After the UE 405 is successfully re-authenticated, the second network slice instance 515 accepts the Additional Attach Request. In some embodiments, the second network slice instance 515 sends 675 an Additional Attach Response message to the UE 405 accepting the attach request. Similar to the Initial Attach Response message, the Additional Attach Response message also includes a list of usage classes supported by the second network slice instance 515. The UE 405 associates the additional attachment with these usage classes (e.g., at least Usage Class Z).

While the depicted embodiment shows authentication between the UE 405 and the second network slice 515 via a re-authentication process, in other embodiments the second network slice instance 515 may authenticate with the UE 405 using full mutual authentication and without any involvement of the first network slice instance 510. Here, the full mutual authentication may be similar to the authentication 620 between the UE 405 and the first network slice instance 510, as described above. After the full mutual authentication between the second network slice instance 515 and the UE 405, the second network slice instance 515 sends a "registration" message to the first network slice 510 to inform the primary slice of the additional attachment of the UE 405. The first network slice instance 510 stores 670 an identity of the secondary network slice acquired via the registration message. In one embodiment, the registration message may include a slice identifier belonging to the second network slice instance 515.

In certain embodiments, the Additional Attach Response message includes an identity for the CP function in the second network slice instance 515 which is assigned to serve the UE 405. The assigned CP function may also be referred to as the "serving" CP function for the UE 405 in the second network slice instance 515. The UE 405 sends all signaling messages relating to the usage classes supported by the second network slice instance 515 (e.g., Usage Class Z) to its serving CP function in second network slice instance 515 by including the CP function identity in these messages.

At this point, the UE 405 is now attached 680 for Usage Class Z, Usage Class X and Usage Class Y. Because the UE 405 was already attached for some usage classes when it attached to the second network slice instance 515, the second network slice instance 515 becomes a secondary network slice to the UE 405. The UE 405 sends 635 all signaling messages relating to Usage Class Z to the second network slice instance 515 (e.g., to the serving CP function in the second network slice instance 515). Note that UE 405 does not know (and does not need to know) if the mobile communication network deploys separate network slice instances (e.g., the first network slice instance 510 and the second network slice instance 515). Rather, the UE 405 is only concerned with attaching for one or more usage classes. In one embodiment, the mobile communication network may be deployed with multiple network slice instances (as discussed above), each one supporting one or more usage classes. In another embodiment, the mobile communication network may be deployed with only one network slice instance that supports multiple usage classes.

In the embodiments of FIG. 6, the first network slice instance 510 is the primary network slice 430 because it is the first slice to which the UE 405 attaches. In other embodiments, the UE 405 may attach first to the network slice instance that supports the usage class of the IoT application 425 (here the second network slice instance 515). In such embodiments, the second network slice instance 515 optimized for IoT traffic (e.g., "Usage Class Z") would be the primary network slice 430 and the first network slice instance 510 optimized for MBB traffic (e.g., "Usage Class X" and/or "Usage Class Y") would be the secondary network slice 435.

Figure 7A:
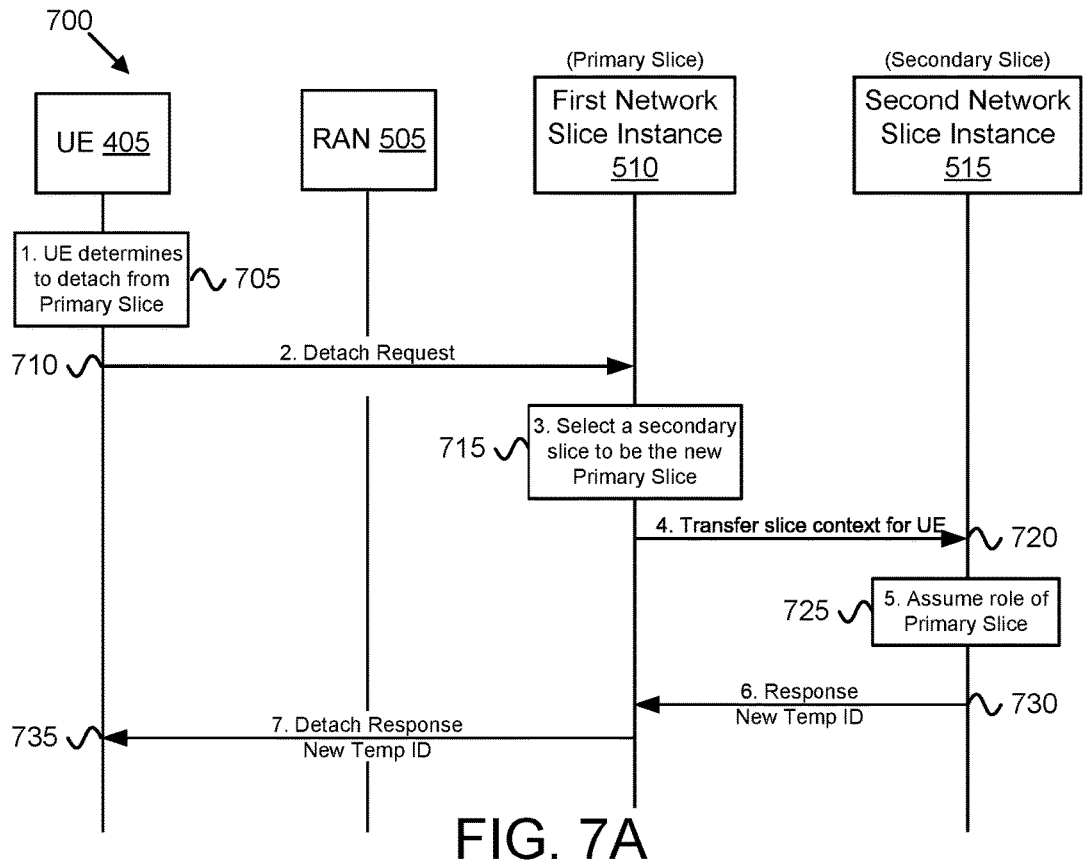
FIG. 7A is a schematic block diagram illustrating one embodiment of a detach procedure used for mobility management among multiple network slices.
Figure 7B:
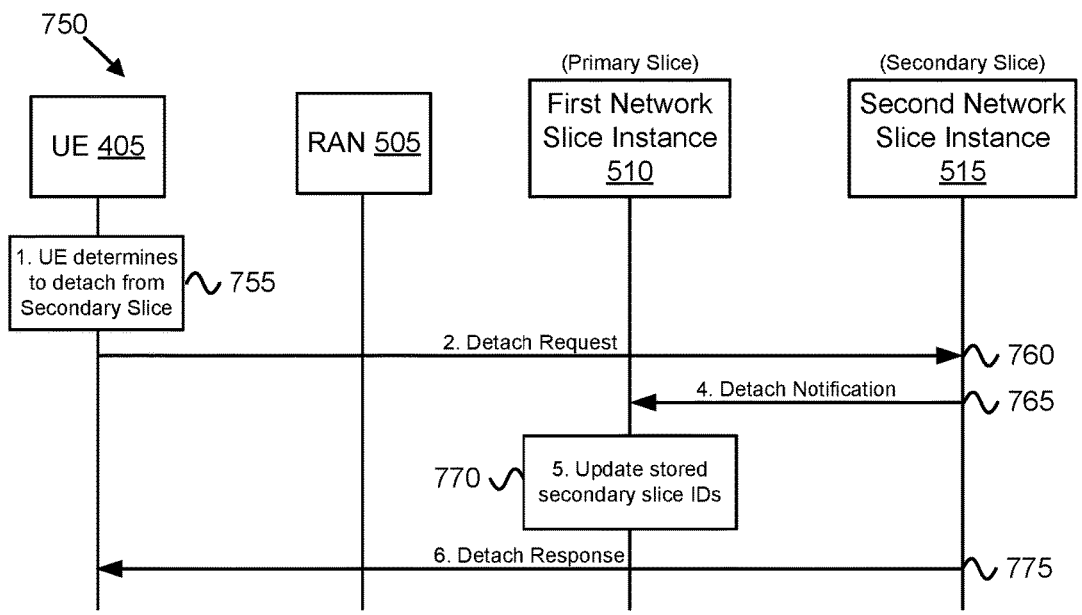
FIG. 7B is a schematic block diagram illustrating another embodiment of a detach procedure used for mobility management among multiple network slices.

FIGS. 7A and 7B illustrate network detach procedures of a UE 405 used for mobility management ("MM") among multiple network slices. FIG. 7A illustrates one embodiment of a detach procedure 700 by which the UE 405 detaches from a primary network slice. In the illustrated embodiment, communication with a UE 405, a RAN 505, a first network slice 510, and a secondary network slice 515 are depicted. The UE 405 may substantially similar to the UE 405 described above with reference to FIGS. 4-6. Additionally, the RAN 505, first network slice instance 510, and the second network slice network instance 515 may be substantially similar as those described above with reference to FIGS. 5-6. It is assumed that the UE 405 is attached to both the first network slice instance 510 (the primary network slice) and the second network slice instance 515 (a secondary network slice) prior to implementing the network detach procedure 700.

At some point while attached to both the first network slice instance 510 and the second network slice instance 515, the UE 405 determines 705 to terminate the last data connection with the first network slice instance 510 and detach from the first network slice instance 510. For example, the UE 405 may have terminated a last data session requiring a usage class supported by the first network slice instance 510. Here, the first network slice instance 510 supports "Usage Class X" and "Usage Class Y." As discussed above, the Usage Class X may correspond to a general application usage class. In one embodiment, where there is no data activity for either the Usage Class X or the Usage Class Y for a predetermined inactivity time period, the UE 405 determines 705 to detach from Usage Class X and Usage Class Y. When these usage classes are supported by the first network slice instance 510, the UE 405 detaches from the first network slice instance 510.

Accordingly, the UE 405 transmits 710 a Detach Request message to the first network slice instance 510. In certain embodiments, the Detach Request message may be a data connection release message. Upon receiving the Detach Request message, the first network slice instance 510 selects 715 one of the secondary network slices (here the second network slice instance 515 is the only secondary network slice) to become the new primary network slice.

The first network slice instance 510 transfers 720 slice context information of the UE 405 to the selected secondary network slice (here the second network slice 515). The slice context information of the UE 405 includes the slice identities of all network slices to which the UE 405 is attached. In one embodiment, the slice context information is a correspondence table storing slice identifiers for each secondary network slice with which the UE 405 is attached.

Upon receiving the slice context information of the UE 405, the second network slice instance 515 becomes 725 the primary network slice 430 for the UE 405. In some embodiments, the second network slice instance 515 (as the new primary network slice) generates a new temporary identity for the UE 405. The new temporary identity includes a slice identifier that uniquely identifies the second network slice instance 515.

The second network slice instance 515 sends 730 a response message to the first network slice instance 510. The response may confirm receipt of the slice context information and/or acknowledge that the second network slice instance 515 is taking over the role of primary network slice for the UE 405. In certain embodiments, the response message contains the new temporary identity for the UE 405 that identifies the second network slice instance 515.

The first network slice 510 sends 735 a Detach Response message to the UE 405. The Detach Response message includes an identifier of the new primary network slice (e.g., the second network slice instance 515). In one embodiment, the Detach Response message contains the new temporary identity for the UE 405. Upon receiving the Detach Response message, the UE 405 identifies the second network slice instance 515 as being the new primary network slice. For example, the UE 405 may use a DNS service to resolve the slice identifier of the second network slice instance 515 into an IP address of the second network slice instance 515 (e.g., of the serving CP function of the second network slice instance 515).

At this point, the UE 405 is detached from the first network slice instance 510. Further, the UE 405 is detached for the usage classes supported by the first network slice instance 510. Here, the UE 405 is detached for both the Usage Class X and the Usage Class Y. The UE 405 will now directs its MM messages to the second network slice instance 515 which has become the new primary network slice for the UE 405.

FIG. 7B illustrates one embodiment of a detach procedure 750 by which the UE 405 detaches from a secondary network slice (e.g., the second network slice instance 515). In the illustrated embodiment, communication with a UE 405, a RAN 505, a first network slice 510, and a secondary network slice 515 are depicted. The UE 405 may substantially similar to the UE 405 described above with reference to FIGS. 4-7A. Additionally, the RAN 505, first network slice instance 510, and the second network slice network instance 515 may be substantially similar as those described above with reference to FIGS. 5-7A. It is assumed that the UE 405 is attached to both the first network slice instance 510 (the primary network slice) and the second network slice instance 515 (a secondary network slice) prior to implementing the network detach procedure 750.

At some point while attached to both the first network slice instance 510 and the second network slice instance 515, the UE 405 determines 755 to terminate the last data connection with the second network slice instance 515 and detach from the second network slice instance 515. For example, the UE 405 may have terminated a last data session requiring a usage class supported by the second network slice instance 515. Here, the second network slice instance 515 supports a "Usage Class Z." As discussed above, the Usage Class Z may correspond to an IoT/MTC usage class. In one embodiment, where there is no data activity for the Usage Class Z for a predetermined inactivity time period, the UE 405 determines 755 to detach from Usage Class Z which leads to UE 405 being detached from the second network slice instance 515.

Accordingly, the UE 405 transmits 760 a Detach Request message to the second network slice instance 515. In certain embodiments, the Detach Request message may be a data connection release message. Upon receiving the Detach Request message, the second network slice instance 515 informs 765 the primary network slice (here the second network slice instance 515).

The first network slice instance 510 updates 770 its stored slice identifiers relating to the secondary network slices with which the UE 405 is attached. Additionally, the first network slice instance 510 ceases to transmit further routing area updates (or other MM messages) to the second network slice instance 515. In certain embodiments, the second network slice instance 515 informs the first network slice instance 510 over the NGs interface 470.

Finally, the second network slice instance 515 sends 775 a Detach Response message to the UE 405. At this point, the UE 405 is detached 780 from the second network slice instance 515. Further, the UE 405 is detached from the usage classes supported by the second network slice instance 515. Here, the UE 405 is detached from the Usage Class Z.

Figure 8A:
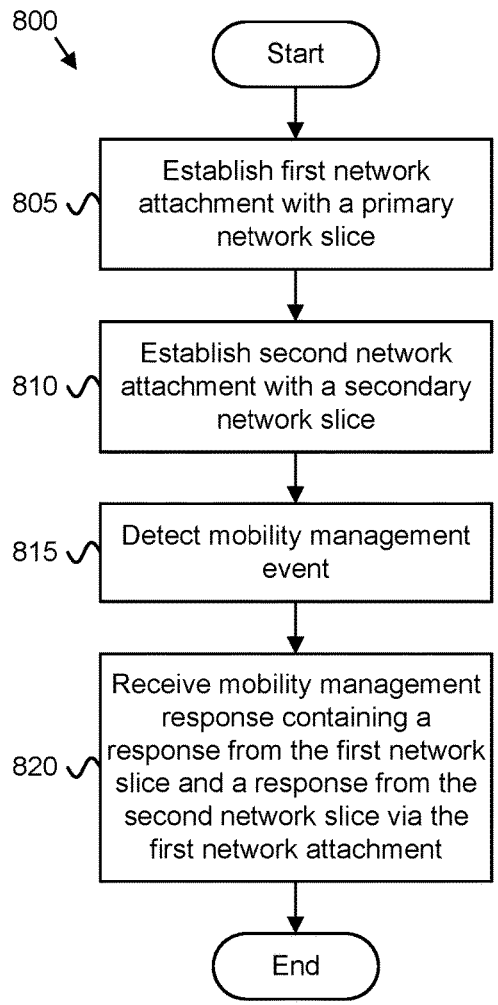
FIG. 8A is a schematic flow chart diagram illustrating one embodiment of a method for mobility management among multiple network slices.

FIG. 8A is a schematic flow chart diagram illustrating one embodiment of a method 800 for mobility management ("MM") among multiple network slices. In some embodiments, the method 800 is performed by an apparatus, such as the remote unit 105 or UE 405. In certain embodiments, the method 800 may be performed by a processor executing program code, for example, a microcontroller, a microprocessor, a CPU, a GPU, an auxiliary processing unit, a FPGA, or the like.

The method 800 may include establishing 805 a first connection with a primary network slice of the mobile communication network. In one embodiment, the processor 205 establishes the first connection with a primary network slice, such as the first network slice instance 510. In some embodiments, establishing 805 the first connection includes authenticating a remote unit with the primary network slice. In certain embodiments, the first connection is a signaling connection with the primary network slice.

Establishing 805 the first connection may include transmitting an initial attach request that includes a first usage class to a radio access network component of the mobile communication network. In certain embodiments, establishing 805 the first connection occurs in response to an application requesting data connectivity for the first usage class. Additionally, establishing 805 the first connection may include receiving an initial attach response from the primary network slice responsive to the initial attach request. In certain embodiments, the initial attach response may include an indication of one or more usage classes supported by the primary network slice as well as a first UE identifier assigned by the primary network slice. The first UE identifier may include an identity of the primary network slice.

The method 800 includes establishing 810 a second connection a secondary network slice in the mobile communication network. In one embodiment, the processor 205 establishes the second connection via a radio transceiver 225. In some embodiments, establishing 810 the second connection includes re-authenticating the remote unit with the primary network slice via the secondary network slice. In certain embodiments, the second connection is a signaling connection with the secondary network slice.

Establishing 810 the second connection may include transmitting an additional attach request containing the first UE identifier assigned by the primary network slice. In certain embodiments, establishing 810 the second connection may include receiving an additional attach response from the secondary network slice. The additional attach response may include a second UE identifier assigned by the secondary network slice. The second UE identifier may include an identity of the secondary network slice.

The method 800 includes detecting 815 a MM event. In one embodiment, the processor 205 detects 815 the MM event. In some embodiments, the MM event is a change in routing area. For example, the processor 205 may detect 815 a change in a routing area. As another example, the MM event may be the expiration of a timer for periodic location update, receipt a paging message, and/or an application on the remote unit 105 generating uplink data.

The method 800 includes receiving 820 a MM response, the MM response being received via the first connection and in response to a MM request sent to the primary network slice, wherein the MM response includes a response from the primary network slice and a response from the secondary network slice. In one embodiment, the radio transceiver 225 receives 820 the MM response.

In some embodiments, the MM request is a routing area (or location) update request, wherein the MM response is a routing area (or location) update response. In another embodiment, the MM request may be a service request, wherein the MM response is a service response containing a response from the primary network slice in a response from the secondary network slice.

In certain embodiments, the MM response indicates whether the primary network slice accepts the MM request and whether the secondary network slice accepts the MM request. In further embodiments, each network slice in the mobile communication network may support at least one of a plurality of usage classes, wherein the MM response includes an update result for each usage class supported by the primary network slice and by the secondary network slice. The method 800 ends.

Figure 8B:
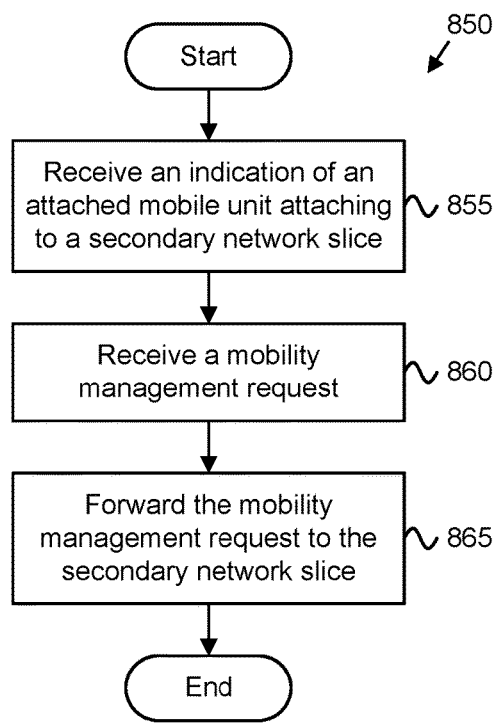
FIG. 8B is a schematic flow chart diagram illustrating another embodiment of a method for mobility management among multiple network slices.

FIG. 8B is a schematic flow chart diagram illustrating one embodiment of a method 850 for mobility management ("MM") among multiple network slices. In some embodiments, the method 850 is performed by an apparatus, such as a network slice 301. In certain embodiments, the method 850 may be performed by a processor executing program code, for example, a microcontroller, a microprocessor, a CPU, a GPU, an auxiliary processing unit, a FPGA, or the like.

The method 850 may include receiving 855 an indication of an attached mobile unit attaching to a secondary network slice in a mobile communication network. In one embodiment, the processor 305 receives 855 the indication of the attached mobile unit (e.g., a remote unit 105) attaching to the secondary network slice via a first network interface. In some embodiments, receiving 855 the indication of the attached mobile unit attaching to the secondary network slice includes receiving a registration request from the secondary network slice. In one embodiment, the registration request includes a slice identifier belonging to the secondary network slice and a mobile unit identifier belonging to the mobile unit. Receiving 855 the indication of the attached mobile unit attaching to the secondary network slice may further include storing the slice identifier belonging to the secondary network slice. In certain embodiments, the first network interface is a NGs interface connecting to the secondary network slice.

The method 850 may include receiving 860 a MM request from the attached mobile unit. In one embodiment, the processor 305 receives 860 the MM request via a second network interface. In some embodiments, the MM request is a routing area (or location) update request. In another embodiment, the MM request may be a service request.

The method 850 may include forwarding 865 the MM request to the secondary network slice. In one embodiment, the processor 305 forwards 865 the MM request via the first network interface. In some embodiments, forwarding 865 the mobility manage request may include identifying a secondary network slice to which the mobile unit is attached, resolving a slice identifier of the secondary network slice into a network address, and transmitting the MM request to the resolved network address. The method 850 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   establishing, at a remote unit, a first connection with a primary network slice of a mobile communication network, the primary network slice providing service for one or more usage classes;
   establishing, at the remote unit, a second connection with a secondary network slice of the mobile communication network while maintaining the first connection, the secondary network slice providing service for one or more additional usage classes;
   detecting a mobility management event for the remote unit; and
   transmitting a single mobility management request to the primary network slice via the first connection in response to the mobility management event; and
   receiving a consolidated mobility management response via the first connection, wherein the consolidated mobility management response includes a first response from the primary network slice that indicates whether the primary network slice accepts the mobility management request and a second response from the secondary network slice that indicates whether the secondary network slice accepts the mobility management request.

2. The method of claim 1, wherein each network slice in the mobile communication network supports at least one of a plurality of usage classes, and wherein the consolidated mobility management response includes an update result for a usage class supported by the primary network slice and a usage class supported by the secondary network slice.

3. The method of claim 1, wherein the consolidated mobility management response is one of a routing area update response and a service response.

4. The method of claim 1, wherein transmitting a single mobility management request to the primary network slice via the first connection in response to the mobility management event occurs without transmitting a mobility management request to the secondary network slice.

5. An apparatus comprising:
   a network interface in a primary network slice for communicating over a mobile communication network, wherein the mobile communication network supports a plurality of usage classes; and
   a processor in the primary network slice that:
   receives a mobility management request from a mobile unit, wherein the mobile unit is simultaneously served by the primary network slice and a secondary network slice of the mobile communication network;

forwards the mobility management request to the secondary network slice; and sends a single mobility management response to the mobile unit, wherein the single mobility management response includes a first response from the primary network slice and a second response from the secondary network slice, wherein the single mobility management response includes a result for each usage class to which the mobile unit is attached.

6. The apparatus of claim 5, wherein the processor further: receives the second response from the secondary network slice.

7. The apparatus of claim 5, wherein the first network slice supports a first usage class, and wherein the second network slice supports a second usage class.

8. The apparatus of claim 5, the processor further:
assigns a user equipment ("UE") identifier to the mobile unit in response to receiving an initial attach request from the mobile unit, wherein the UE identifier includes an identity of the apparatus; and
transmits an initial attach response to the mobile unit, the initial attach response including an indication of one or more usage classes supported by the apparatus and the UE identifier.

9. The apparatus of claim 5, wherein the processor forwarding the mobility management request to the secondary network slice comprises:
identifying the secondary network slice to which the mobile unit is attached; and
transmitting the mobility management request to the secondary network slice using a destination network address corresponding to a slice identifier belonging to the secondary network slice.

10. The apparatus of claim 5, wherein the processor receives an indication of an attached mobile unit attaching to the secondary network slice of the mobile communication network.

11. The apparatus of claim 10, wherein receiving an indication of the mobile unit attaching to a secondary network slice comprises:
receiving a registration request from the secondary network slice, the registration request including a slice identifier belonging to the secondary network slice and a mobile unit identifier belonging to the mobile unit; and
storing the slice identifier belonging to the secondary network slice.

12. The apparatus of claim 11, wherein the registration request is a re-authentication request received from the secondary network slice, and wherein the processor further re-authenticates the apparatus with the mobile unit via the secondary network slice in response to receiving the re-authentication request.

13. The apparatus of claim 5, wherein the processor further:
receives a deregistration message from the secondary network slice in response to the mobile unit detaching from the second network slice, wherein the processor ceases forwarding, to the second network slice, one or more mobility management requests received from the mobile unit in response to the deregistration message.

14. The apparatus of claim 5, wherein the processor further:
selects a second network slice in response to receiving a detach request from the mobile unit, the second network slice to become a new primary network slice;
transmits a set of slice identities to the selected second network slice, the set of slice identities including all secondary network slices to which the mobile unit is connected;
receives a user equipment ("UE") identifier from the second network slice; and
transmits, to the mobile unit, a detach response containing the UE identifier, wherein the UE identifier includes an identity of the second network slice.

15. A method comprising:
receiving a mobility management request at a primary network slice of a mobile communication network from a mobile unit, wherein the mobile unit is simultaneously served by the primary network slice and a secondary network slice of the mobile communication network, wherein the mobile communication network supports a plurality of usage classes;
forwarding the mobility management request to the secondary network slice; and
transmitting a single mobility management response to the mobile unit, wherein the single mobility management response includes a first response from the primary network slice and a second response from the secondary network slice, wherein the single mobility management response includes a result for each usage class to which the mobile unit is attached.

16. The method of claim 15, further comprising:
assigning a user equipment ("UE") identifier to the mobile unit in response to receiving an initial attach request from the mobile unit, wherein the UE identifier includes an identity of the apparatus; and
transmitting an initial attach response to the mobile unit, the initial attach response including an indication of one or more usage classes supported by the apparatus and the UE identifier.

17. The method of claim 15, wherein forwarding the mobility management request to the secondary network slice comprises:
identifying the secondary network slice to which the mobile unit is attached; and
transmitting the mobility management request to the secondary network slice using a destination network address corresponding to a slice identifier belonging to the secondary network slice.

18. The method of claim 15, wherein the processor further comprising:
receiving a deregistration message from the secondary network slice in response to the mobile unit detaching from the second network slice; and
ceasing to forward one or more mobility management requests received from the mobile unit to the second network slice in response to the deregistration message.

* * * * *